United States Patent
Inoue et al.

(10) Patent No.: US 6,846,764 B2
(45) Date of Patent: Jan. 25, 2005

(54) SILICON NITRIDE POROUS BODY AND METHOD OF MANUFACTURING THE SAME

(75) Inventors: Katsuhiro Inoue, Ama-gun (JP); Kenji Morimoto, Kasugai (JP); Masaaki Masuda, Nagoya (JP); Shinji Kawasaki, Nagoya (JP); Hiroaki Sakai, Nagoya (JP)

(73) Assignee: NGK Insulators, Ltd. (JP)

( * ) Notice: Subject to any disclaimer, the term of this patent is extended or adjusted under 35 U.S.C. 154(b) by 17 days.

(21) Appl. No.: 10/311,714

(22) PCT Filed: Mar. 25, 2002

(86) PCT No.: PCT/JP02/02825

§ 371 (c)(1),
(2), (4) Date: Dec. 19, 2002

(87) PCT Pub. No.: WO02/076908

PCT Pub. Date: Oct. 3, 2002

(65) Prior Publication Data

US 2003/0186801 A1 Oct. 2, 2003

(30) Foreign Application Priority Data

Mar. 26, 2001 (JP) .......................................... 2001-087912

(51) Int. Cl.[7] ............................................. C04B 35/591
(52) U.S. Cl. ................... 501/97.1; 501/97.2; 501/97.3; 502/200; 264/628; 264/647; 264/659
(58) Field of Search ................. 501/97.1, 97.2, 501/97.3; 502/500; 264/628, 647, 659

(56) References Cited

U.S. PATENT DOCUMENTS

| | | | | |
|---|---|---|---|---|
| 5,382,396 A | * | 1/1995 | Lee et al. .................... 264/628 |
| 5,405,592 A | * | 4/1995 | Edler et al. ................... 423/344 |
| 5,618,765 A | * | 4/1997 | Takeuchi et al. ............... 501/80 |
| 5,695,700 A | * | 12/1997 | Takeuchi et al. ............. 264/626 |
| 5,696,042 A | * | 12/1997 | Matsuura et al. ............ 264/628 |
| 5,780,374 A | * | 7/1998 | Kawai et al. ................ 501/97.1 |
| 6,143,677 A | * | 11/2000 | Miyanaga et al. .......... 501/97.4 |
| 6,565,797 B2 | * | 5/2003 | Miyakawa et al. .......... 264/628 |
| 6,593,261 B2 | * | 7/2003 | Shinohara et al. .......... 501/97.1 |
| 2002/0043735 A1 | | 4/2002 | Miyakawa .................... 264/43 |

FOREIGN PATENT DOCUMENTS

| | | |
|---|---|---|
| JP | 52-121613 | 10/1977 |
| JP | 63-89462 | 4/1988 |
| JP | 6-116045 | 4/1994 |
| JP | 2001-293315 | 10/2001 |
| WO | WO 01/47833 A1 | 7/2001 |

OTHER PUBLICATIONS

Translation of JP 2001293315, Oct. 23, 2001.*

* cited by examiner

*Primary Examiner*—Karl Group
(74) *Attorney, Agent, or Firm*—Parkhurst & Wendel, L.L.P.

(57) ABSTRACT

A silicon nitride porous body which is obtained by nitriding a molded body having metallic silicon as a main component and by performing a high temperature heating treatment at a temperature higher than the nitriding temperature, and which has a porous structure with an average pore diameter of 3 μm or above, and contains at least one kind of element selected from the group consisting of the groups 2A, 3A, 3B inclusive of lanthanoid elements, and 4B. The silicon nitride porous body has a porous structure with a large average pore diameter, a test specimen cut out from the porous body exhibiting a high thermal conductivity and a small thermal expansion coefficient, and can be suitably used in a component for purifying gas and/or solution such as a ceramic filter.

12 Claims, No Drawings

SILICON NITRIDE POROUS BODY AND METHOD OF MANUFACTURING THE SAME

TECHNICAL FIELD

The present invention relates to a silicon nitride porous body and a method of manufacturing the same. In more detail, the present invention relates to a silicon nitride porous body, which has a porous structure with a large average pore diameter, from which a test specimen cut out exhibits a high thermal conductivity and a small thermal expansion coefficient, and which is suitably used as a component for purifying gas and/or solution such as a ceramic filter pore diameter, and an efficient method of manufacturing the same.

BACKGROUND ART

Silicon nitride is superior to other ceramics in heat resistance, strength, fracture toughness, and the like, and hence a porous body made thereof is expected to be used as a component for purifying gas and/or solution such as a ceramic filter (for example, a honeycomb structure in a device for purifying an exhaust gas of an internal combustion engine, and the like).

However, silicon nitride is higher in raw material price as compared to other ceramics and furthermore high in sintering temperature so that the production cost thereof inevitably becomes high. Accordingly, although silicon nitride has excellent characteristics as described above, it has not yet come into wide use, as affairs stand.

On the other hand, metallic silicon (Si) is lower in price compared to silicon nitride, and a number of methods have been attempted in which metallic silicon is nitrided by use of a nitriding reaction, that is an exothermic reaction, to obtain a silicon nitride sintered body. As a method for obtaining a silicon nitride sintered body based on such a reaction sintering method, there is disclosed, for example, a method for obtaining a silicon nitride sintered body from a fine Si powder (Japanese Patent Laid-Open No. 52-121613).

In such a reaction sintering method using metallic silicon, generally the sintering is made while nitriding by allowing nitrogen gas to react with a molded body consisting of a mixture composed of a metallic silicon powder and a silicon nitride powder. A silicon nitride sintered body thus obtained is excellent in thermal shock resistance, abrasion resistance, high electric resistance, and chemical stability, and also excellent in that the dimensional change during the reaction sintering is so small that a sintered body having a high degree of dimensional precision can be obtained (during the reaction sintering, the weight increases by about 60%, but the dimensional change is small, so that a relatively fine sintered body can be obtained with almost the same dimension and shape as those of the molded body before the reaction sintering).

However, when such a silicon nitride sintered body is applied to a component for purifying gas and/or solution such as a ceramic filter (for example, a honeycomb structure in a device for purifying an exhaust gas of an internal combustion engine, and the like), in order to improve filter characteristics and purification characteristics, it is necessary to control a sintered body so as to have a porous structure with a high open porosity and a large pore diameter. A nitriding treatment of a metallic silicon molded body having a low molded body density, for a purpose of obtaining a porous body having a high open porosity, yields a porous structure in which fine silicon nitride fibers are generated not only on a surface but also in an interior, to yield a porous structure of a small pore diameter. In a porous body having a small pore diameter, a permeability coefficient becomes small, so that a high pressure is required for permeation of gas or solution. For example, for a solution system, a feed pump capacity needs to be increased.

In addition, when a porous body small in pore diameter is used for an exhaust gas purifying device, a back pressure becomes high to degrade an engine performance. Moreover, when a catalyst is loaded on a porous body, it is possible to obtain a product having a high purification ratio by using a carrier with a large open porosity and a large pore diameter.

The present invention was achieved in consideration of the above described problems, and takes as its object the provision of a silicon nitride porous body, which has a porous structure with a large average pore diameter, from which a test specimen cut out exhibits a large thermal conductivity and a small thermal expansion coefficient, and which is suitably used as a component for purifying gas and/or solution such as a ceramic filter, and an efficient method of manufacturing the same.

DISCLOSURE OF THE INVENTION

The present inventors have perfected the present invention, by finding that it is possible to obtain a silicon nitride porous body with an average pore diameter of 3 μm or above by using a metallic silicon as a starting material, adding, to the metallic silicon powder, a powder which is to be an aid capable of forming a liquid phase at a high temperature, when nitriding metallic silicon, and making $Si_3N_4$ fibers dissolve in and deposit from the liquid phase formed by exposing metallic silicon to a high temperature, as a result of diligent study for obtaining a silicon nitride porous body which has a porous structure optimal for use in a component for purifying gas and/or solution such as a ceramic filter.

In other words, the present invention provides the following silicon nitride porous body and the following method of manufacturing the same.

[1] A silicon nitride porous body which is obtained by nitriding a molded body having metallic silicon as a main component and by performing a high temperature heat treatment at a temperature higher than the nitriding temperature, characterized in that: the silicon nitride porous body has a porous structure with an average pore diameter of 3 μm or above; and contains at least one kind of element selected from the group consisting of the groups 2A, 3A, 3B inclusive of lanthanoid elements, and 4B.

[2] The silicon nitride porous body according to the above [1], wherein a content of the above described element is 0.1 to 10 mass % as converted to the oxide thereof.

[3] The silicon nitride porous body according to the above [1] or [2], wherein an open porosity is 30% or above.

[4] The silicon nitride porous body according to any of the above [1] to [3], wherein a test specimen cut out therefrom has a thermal conductivity of 10 W/m·K or above and a thermal expansion coefficient of 4 ppm/° C. or below.

[5] The silicon nitride porous body according to any of the above [1] to [4], wherein a content ratio of β type silicon nitride to a total content of silicon nitride is 50% or above.

[6] A method of manufacturing a silicon nitride porous body by nitriding a molded body having metallic silicon as a main component, characterized by: preparing a mixture by adding, to a metallic silicon powder, a compound containing at least one kind of element selected from the group consisting of the groups 2A, 3A, 3B inclusive of lanthanoid elements, and 4B; molding the obtained mixture; and while introducing nitrogen gas to the obtained molded body, keeping the obtained molded body at a temperature at which the nitriding reaction of metallic silicon occurs, subsequently performing a heat treatment of the body at a temperature higher than the nitriding temperature.

[7] The method of manufacturing a silicon nitride porous body according to the above [6], wherein the mixture is prepared by adding the above described element in 0.1 to 10 mass % as converted to the oxide thereof.

[8] A ceramic filter characterized by being made of the silicon nitride porous body according to any of the above [1] to [5].

[9] A component for purifying gas and/or solution characterized in that the component has a structure of loading a catalyst on a surface of the silicon nitride porous body according to any of the above [1] to [5].

[10] A component for purifying gas characterized by having a structure of loading a NOx storage catalyst on a surface of the silicon nitride porous body according to any of the above [1] to [5].

BEST MODE FOR CARRYING OUT THE INVENTION

Specific description will be made on the embodiments of the silicon nitride porous body and the method of manufacturing thereof of the present invention.

The silicon nitride porous body of the present invention is a silicon nitride porous body obtained by nitriding a molded body having metallic silicon as a main component (Here, "a molded body having metallic silicon as a main component" means a molded body obtained by molding a metallic silicon (for example, a metallic silicon powder) by a powder molding such as slip casting, injection molding, tape molding, extrusion molding, or press molding; and can contain an auxiliary agent such as an oxide, a nitride, a fluoride, a carbonate, or a nitrate as a secondary component, but a total amount of the secondary component does not exceed a content of the metallic silicon powder.), for example, a molded body obtained by molding a mixture of the metallic silicon powder (grains) and a compound, added thereto, containing at least one kind of element selected from a group consisting of the groups 2A, 3A, 3B inclusive of lanthanoid elements, and 4B, and by performing a high temperature heat treatment at a temperature higher than the nitriding temperature, and characterized by having a porous structure with an average pore diameter of 3 $\mu$m or above, and containing at least one kind of element, preferably in 0.1 to 10 mass % as converted to oxide thereof, selected form the group consisting of the groups 2A, 3A, 3B inclusive of lanthanoid elements, and 4B. A content of the above described element is different depending on the added element, and hence an optimal content value cannot necessarily be uniquely specified; when the content is smaller than 0.1%, a microstructure with a large average pore diameter sometimes cannot be obtained.

A compound containing the above described element is usually added in a state of oxide, but it may be added in a form of carbonate, fluoride, nitride, carbide, or the like.

The specific examples of an oxide include MgO, CaO, SrO, BaO, $Al_2O_3$, $Y_2O_3$, $CeO_2$, $Sm_2O_3$, $Er_2O_3$, $Yb_2O_3$, $TiO_2$, $ZrO_2$, $HfO_2$, and the like. The corresponding carbonate, nitrate, fluoride, or nitride is also acceptable.

An average pore diameter of the porous structure in the silicon nitride porous body of the present invention is 3 $\mu$m or above, preferably 5 $\mu$m or above. With the average pore diameter smaller than 3 $\mu$m, a characteristic of the porous body is degraded when used in a purifying component such as a filter (With decreasing the average pore diameter, a permeability coefficient is decreased as proportional to the squared pore diameter, and hence a large pore diameter is essential for use as a filter.). For the purpose of obtaining a component small in pressure drop, it is preferable to control a microstructure to have an average pore diameter of 5 $\mu$m or above. There is no particular upper limit to the average pore diameter, but strength is degraded with the average pore diameter exceeding 100 $\mu$m.

In addition, the silicon nitride porous body of the present invention has preferably a nitridation ratio of 90% or above (the nitridation ratio means a ratio of metallic silicon converted to silicon nitride, and a value calculated from an X-ray diffraction intensity ratio of metallic silicon and silicon nitride). With the nitridation ratio of silicon smaller than 90%, the thermal expansion coefficient becomes high, and with a large residual amount of metallic silicon, a high temperature strength sometimes is degraded.

As for the silicon nitride porous body of the present invention, a thermal conductivity of a test specimen cut out from the porous body is preferably 10 W/m·K or above, more preferably 20 W/m·K or above. With the thermal conductivity smaller than 10 W/m·K, the porous body sometimes becomes a porous body poor in a thermal shock characteristic.

In this connection, a thermal expansion coefficient of a test specimen cut out from the porous body is preferably 4 ppm/° C. or below, more preferably 3.5 ppm/° C. or below. With the thermal expansion coefficient exceeding 4 ppm/° C., the porous body sometimes becomes a porous body poor in a thermal shock characteristic.

An open porosity of the porous structure in the silicon nitride porous body of the present invention is preferably 30% or above, more preferably 40% or above. With the open porosity smaller than 30%, when used in a purifying component such as a filter, a characteristic thereof is sometimes degraded (With the open porosity smaller than 30%, for example, when used in a filter, sometimes a pressure becomes so high that it becomes a system having a large load. In addition, an effective space becomes scarce, and hence efficiency as a purifying device is sometimes degraded when loading a catalyst.).

In the silicon nitride porous body of the present invention, a content ratio of $\beta$ type silicon nitride to a total content of silicon nitride is preferably 50% or above. With the content ratio of $\beta$ type silicon nitride smaller than 50%, the porous body is constituted by a type silicon nitride having a small grain size, and hence sometimes an average pore diameter becomes small. For the purpose of obtaining a porous body constituted by grains with a high thermal conductivity, it is further preferable to make a $\beta$ conversion ratio be 90% or above.

A method of manufacturing a silicon nitride porous body of the present invention is a method of obtaining a silicon nitride porous body by nitriding a molded body having metallic silicon as the main component, and is characterized by preparing a mixture by adding, to metallic silicon, a compound containing at least one kind of element selected from a group consisting of the groups 2A, 3A, 3B inclusive of lanthanoid elements, and 4B, preferably in 0.1 to 10 mass % as converted to oxide thereof, molding the obtained mixture, and while introducing nitrogen gas to the obtained molded body, keeping the obtained molded body at a temperature at which the nitriding reaction of metallic silicon occurs, subsequently performing a heat treatment of the body at a temperature higher than the nitriding temperature.

In this connection, the above described substances can be used as metallic silicon and a compound containing at least one kind of element selected from the group consisting of the groups 2A, 3A, 3B inclusive of lanthanoid elements, and 4B.

The above described compound containing at least one kind of element selected from the group consisting of the groups 2A, 3A, 3B inclusive of lanthanoid elements, and 4B is a material displaying a function as an aid capable of forming a liquid phase at a high temperature. By the process of, preparing a mixture by adding the compound as the aid to metallic silicon, molding the obtained mixture, and while introducing nitrogen gas to the obtained molded body, keeping the obtained molded body at a temperature at which the nitriding reaction of metallic silicon occurs, subsequently performing a heat treatment at a temperature higher than the nitriding temperature; the compound as the aid exposed to a high temperature forms a liquid phase, fibrous $Si_3N_4$ grains dissolve in the liquid phase and deposit as large columnar grains. In this manner, it is possible to obtain a silicon nitride porous body which is mainly constituted with large $\beta Si_3N_4$ columnar grains and has an average pore diameter of 3 μm or above.

When an addition amount of the compound as the aid exceeds 10 mass %, a high temperature characteristic such as an oxidation resistance is degraded. In addition, depending on a type of the aid, a thermal expansion coefficient becomes high.

On the other hand, when the addition amount of the compound as the aid is smaller than 0.1 mass %, a function as the aid cannot be displayed fully.

In the method of manufacturing a silicon nitride porous body of the present invention, when a molded body is made to be high in open porosity, it is possible to obtain a porous sintered body, which has a high open porosity as taken over from the molded body.

Metallic silicon used in the method of manufacturing a silicon nitride porous body of the present invention is preferably granular, and an average grain diameter is preferably 10 μm or above, more preferably 30 μm or above. When the average grain diameter is smaller than 10 μm, sometimes the average pore diameter becomes smaller than 3 μm.

However, when a metallic silicon molded body with such a high open porosity as described above is nitrided as it is, silicon nitride fibers are generated not only on a surface but also in an interior of the metallic silicon molded body; there occurs a problem that a porous body in which silicon nitride fibers are formed becomes small in pore diameter, so that a pressure loss becomes larger when a gas permeates.

A formation mechanism of such silicon nitride fibers is interpreted as that an oxide on a surface of metallic silicon is evaporated as SiO gas, and reacts with nitrogen gas to deposit and grow as fibrous silicon nitride.

As in the method of manufacturing a silicon nitride porous body of the present invention, when a metallic silicon molded body containing the compound as the aid is nitrided, by performing a heat treatment of the molded body at a temperature higher than a temperature at which nitriding reaction of metallic silicon occurs, after keeping the body at a temperature at which a nitriding reaction occurs; a fibrous nitride based grains dissolve in a liquid phase once and deposit as $\beta Si_3N_4$ grains, and hence a silicon nitride porous body without fiber structure can be obtained.

Incidentally, by controlling the deposition reaction of $\beta Si_3N_4$ grains, large-sized columnar grains can be formed, and the average pore diameter can be made further larger.

By controlling an addition amount of the compound as the aid and a temperature condition for the high temperature treatment after keeping at a certain temperature, an deposition reaction of $\beta Si_3N_4$ grains can be controlled, and as a result, it is possible to obtain a porous body which has a porous structure with large pore diameter, a low thermal expansion coefficient, and an excellent strength.

In the method of manufacturing a silicon nitride porous body of the present invention, a silicon nitride porous body having a large thermal conductivity can be obtained, as described below.

Silicon nitride used in the method of manufacturing a silicon nitride porous body of the present invention is an excellent material in improving a thermal conductivity. In other words, a non-oxide ceramic, inclusive of silicon nitride, such as aluminum nitride or silicon carbide is generally higher in thermal conductivity than an oxide ceramic such as cordierite or alumina, and is excellent in improving a thermal conductivity, so that by using such a material it is possible to obtain a silicon nitride porous body large in thermal conductivity.

Furthermore, in the case where silicon nitride is obtained by nitriding reaction using metallic silicon as a starting material, when oxygen is present on a surface of metallic silicon, oxygen remains in silicon nitride to degrade the thermal conductivity; but in the method of manufacturing a silicon nitride porous body of the present invention, a porous structure is constituted with relatively large $\beta Si_3N_4$ grains having a history of a dissolution and deposition process, and hence $\beta Si_3N_4$ grains which form the framework can be made to be highly pure grains as such, and accordingly it is possible to obtain a silicon nitride porous body with a large thermal conductivity.

As described above, the silicon nitride porous body of the present invention can have a porous structure constituted with relatively large $\beta Si_3N_4$ columnar silicon nitride grains having a history of a dissolution and deposition reaction, and accordingly the thermal expansion coefficient can be made small. In this way, owing to the small thermal expansion coefficient, a porous body excellent in thermal shock resistance can be provided, which can be suitably used in a component used at a high temperature for purifying gas and/or solution, such as a heat-resistant filter or a catalyst carrier.

In addition, the silicon nitride porous body of the present invention is composed of relatively large $\beta Si_3N_4$ grains having a history of a dissolution and deposition reaction, and accordingly it can be a porous body of which a strength and Young's modulus are large although both an open porosity and a pore diameter are large in such a way that the open porosity is 30% or above and the pore diameter is 3 μm or above. By using the silicon nitride porous body of the present invention, it is possible to provide a highly reliable component for purifying gas and/or solution. In addition, even when a silicon nitride porous body which has a large pore diameter exceeding 10 μm and a high porosity exceeding 50% is manufactured by adding a pore forming agent such as starch or cellulose, there can be provided a highly reliable porous body component wherein a reduction of the strength and Young's modulus is suppressed.

A ceramic filter of the present invention is characterized by being made of the above described silicon nitride porous body.

In addition, a component for purifying gas and/or solution of the present invention is characterized by having a structure of loading a catalyst on a surface of the above described silicon nitride porous body.

In this case, as for the catalyst, there is no particular restriction, and for example, a NOx storage catalyst can be cited.

When a body large in thermal conductivity such as the silicon nitride porous body of the present invention is used as a catalyst carrier in a component for purifying gas and/or solution such as a ceramic filter, the catalytic performance can be fully displayed, since a thermal uniformity and a thermal shock resistance thereof become excellent.

Further specific description will be made below with reference to Examples, but these Examples do not imply any restrictions as to the present invention.

EXAMPLES 1 TO 7

Polyvinyl alcohol (PVA) (2 parts by volume) as a molding aid was added to a mixed powder (100 parts by volume) prepared by adding the oxide, carbonate, or nitride in the individual mass percentage shown in Table 1 to a metallic silicon powder of 30 μm in an average grain diameter, and a molded body was formed using a metal mold press.

The molded body, from which the molding aid was removed at 500° C. in the air, was kept at 1450° C. for 5 hours in the nitrogen atmosphere, to be subjected to the nitriding treatment, and subsequently kept at 1700° C. for 2 hours to obtain a sintered body. From the obtained sintered body, test specimens of 4×3×40 mm, φ10×3 mm, and the like were cut out, and were subjected to measurements of the following evaluation items, and the results are shown in Table 1.

Open porosity: measured by the method of weight in water.

Comparative Example 2

Comparative Example 2 was carried out in the same way as Example 1 except that the high temperature heating treatment (retention at 1700° C. for 2 hours) performed after nitriding in Example 1 was not performed. The measurements of the above described evaluation items were performed as in Example 1, and the results are shown in Table 1. The obtained sintered body had a lot of silicon nitride fibers therein, owing to the lack of the high temperature heating treatment after the nitriding, and only a sintered body having a small average pore diameter could be obtained.

In the sintered bodies obtained in Comparative Examples 1 and 2, there were (remained) a lot of silicon nitride fibers, and the specific areas of these sintered bodies showed larger values than those obtained in Examples.

TABLE 1

| | Examples | | | | | | | Comparative Examples | |
|---|---|---|---|---|---|---|---|---|---|
| | 1 | 2 | 3 | 4 | 5 | 6 | 7 | 1 | 2 |
| Added aid content (mass %) | 1% $Y_2O_3$ | 1% $Y_2O_3$ 1% MgO | 1% $Y_2O_3$ 1% MgO 1% $ZrO_2$ | 1% $SrCO_3$ 1% MgO 1% $CeO_2$ | 5% $SrCO_3$ 5% MgO 5% $CeO_2$ | 1% $CaCO_3$ | 1% AlN | None | 1% $SrCO_3$ 1% MgO 1% $CeO_2$ |
| Open porosity (%) | 44 | 45 | 42 | 46 | 33 | 44 | 35 | 44 | 41 |
| Average pore diameter (μm) | 8 | 8 | 7 | 5 | 4 | 5 | 5 | 2 | 1 |
| Thermal conductivity (W/m · K) | 21 | 20 | 18 | 19 | 9 | 25 | 32 | 22 | 12 |
| Thermal expansion coefficient (ppm/° C.) | 3.1 | 3.1 | 3.2 | 3.2 | 3.7 | 3.2 | 3.1 | 3.0 | 3.2 |
| Four point bending strength (MPa) | 26 | 31 | 30 | 39 | 28 | 29 | 79 | 50 | 30 |
| Young's modulus (GPa) | 29 | 33 | 32 | 31 | 26 | 31 | 81 | 55 | 25 |
| β conversion ratio (%) | 95 | 95 | 94 | 91 | 91 | 100 | 94 | 85 | 75 |
| Specific surface area ($m^2$/g) | 0.3 | 0.2 | 0.2 | 0.4 | 0.2 | 0.2 | 0.1 | 1.2 | 1.3 |

Average pore diameter distribution: measured with a porosimeter using mercury.

Thermal conductivity: measured by a laser flash method.

Thermal expansion coefficient: measured with a push rod differential thermodilatometer.

Four point bending strength: measured with a test specimen cut out in the shape of 4×3×40 mm in conformity with JIS R 1601.

Young's modulus: measured in conformity with JIS R 1602 by the strain gauge method at the time of measuring the four-point bending strength.

β conversion ratio: calculated from X-ray diffraction intensity ratios of (102) and (210) of $\alpha Si_3N_4$, and (101) and (210) of $\beta Si_3N_4$.

Specific surface area: measured by the gas adsorption BET method.

Comparative Example 1

Comparative example 1 was carried out in the same way as Example 1 except that the sintering aid used in Example 1 was not added. The measurements of the above described evaluation items were performed as in Example 1, and the results are shown in Table 1. The obtained sintered body had a lot of silicon nitride fibers therein and a porous structure very small in average pore diameter.

EXAMPLES 8 AND 9

Methyl cellulose (10 parts by volume) and water (40 parts by volume) were added to a mixed powder (100 parts by volume) composed of a metallic silicon powder having an average grain size of 30 μm and the sintering aid shown in Table 2 added thereto, and moreover, a surfactant (1 part by volume) was added, and a material for use in extrusion was prepared using a kneading machine. A honeycomb structure was molded by using a plunger type extrusion machine. After the molding aid was removed from the obtained honeycomb molded body at 500° C. as in Example 1, the obtained honeycomb molded body was kept at 1450° C. for 5 hours in the nitrogen atmosphere to be subjected to the nitriding treatment, and subsequently kept at 1700° C. for 2 hours to obtain a sintered body. A portion of the obtained sintered body was cut out and the open porosity, average pore diameter, and β conversion ratio were measured as in Example 1. A test specimen of honeycomb rib thickness was cut out from the obtained sintered body, and the thermal conductivity was measured by a laser method and the thermal expansion coefficient was measured by the push rod differential type method. The results are shown in Table 2.

Comparative Example 3

Comparative Example 3 was carried out in the same way as Example 8 except that the sintering aid added in Example 8 was not added. The measurements of the evaluation items were performed as in Example 8, and the results are shown in Table 2. Since no sintering aid was used, a lot of fibrous silicon nitride grains were present in the obtained sintered body, yielding a porous structure small in average pore diameter.

Comparative Example 4

Comparative Example 4 was carried out in the same way as Example 8 except that the high temperature heating treatment (retention at 1700° C. for 2 hours) after nitriding in Example 8 was not performed. The measurements of the above described evaluation items were performed as in Example 8, and the results are shown in Table 2. Since the high temperature heating treatment was not performed, a lot of fibrous silicon nitride grains remained in the obtained silicon nitride porous body, yielding a porous structure small in average pore diameter.

EXAMPLES 10 TO 12

An acrylic resin binder (35 parts by volume), a plasticizer (3 parts by volume) were added, and toluene (55 parts by volume) and isopropyl alcohol (30 parts by volume) as solvents were added to a mixed powder (100 parts by volume) composed of a metallic silicon powder having an average grain diameter of 30 $\mu$m and the sintering aid(s) shown in Table 2 added thereto, and a slurry was prepared by using a pot mill. A tape 200 $\mu$m thick is molded by using a doctor blade molding machine. After the molding aid was removed from the tape molded body at 500° C. as in Example 1, the tape molded body was kept at 1450° C. for 5 hours in the nitrogen atmosphere to be subjected to the nitriding treatment, and subsequently kept at 1700° C. for 2 hours to obtain a sintered body. A portion of the obtained sintered body was cut out, and the open porosity, average pore diameter and β conversion ratio were measured, as in Example 1. A test specimen of honeycomb rib thickness was cut out from the obtained sintered body, and the thermal conductivity was measured by the laser method and the thermal expansion coefficient was measured by the push rod differential method. The results are shown in Table 2.

Comparative Example 5

Comparative Example 5 was carried out in the same way as Example 11 except that the high temperature heating treatment (keeping at 1700° C. for 2 hours) after nitriding in Example 11 was not performed. The measurements of the above described evaluation items were performed as in Example 11, and the results are shown in Table 2. Since the high temperature heating treatment was not performed, a lot of fibrous silicon nitride grains remained in the obtained tape sintered body, yielding a porous structure small in average pore diameter.

Industrial Application

As described above, according to the present invention, there can be provided a silicon nitride porous body, which has a porous structure with a large average pore diameter, from which the test specimen cut out exhibits a high thermal conductivity and a small thermal expansion coefficient, which is suitably used as a component for purifying gas and/or solution such as a ceramic filter, and an efficient method of manufacturing the same porous body.

What is claimed is:

1. A silicon nitride porous body which is obtained by nitriding a molded body having metallic silicon as a main component and by performing a high temperature heat treatment at a temperature higher than the nitriding temperature, characterized in that:

the silicon nitride porous body has a porous structure with an average pore diameter of 3 $\mu$m or above and an open porosity of 30% or above; and contains at least one kind of element selected from the group consisting of the groups 2A, 3A, 3B inclusive of lanthanoid elements, and 4B.

2. The silicon nitride porous body according to claim 1, wherein a content of the element is 0.1 to 10 mass % as converted to the oxide thereof.

3. The silicon nitride porous body according to claim 1, wherein a test specimen cut out therefrom has a thermal conductivity of 10 W/m·K or above and a thermal expansion coefficient of 4 ppm/° C. or below.

4. The silicon nitride porous body according to claim 1, wherein a content ratio of β type silicon nitride to a total content of silicon nitride is 50% or above.

5. A method of manufacturing a silicon nitride porous body by nitriding a molded body having metallic silicon as a main component, comprising:

preparing a mixture by adding, to a metallic silicon powder, a compound comprising at least one kind of element selected from the group consisting of the groups 2A, 3A, 3B inclusive of lanthanoid elements, and 4B;

molding the obtained mixture; and while introducing nitrogen gas to the obtained molded body, keeping the obtained molded body at a temperature at which the nitriding reaction of metallic silicon occurs, subsequently performing a heat treatment of the body at a temperature higher than the nitriding temperature to produce said silicon nitride porous body with an average pore diameter of 3 $\mu$m or above.

TABLE 2

| | Examples | | | | | Comparative Examples | | |
|---|---|---|---|---|---|---|---|---|
| | 8 | 9 | 10 | 11 | 12 | 3 | 4 | 5 |
| Molding method | Extrusion | Extrusion | Tape | Tape | Tape | Extrusion | Extrusion | Tape |
| Added aid content (mass %) | 1% $Y_2O_3$ | 1% $SrCO_3$ 1% MgO 1% $CeO_2$ | 1% $CaCO_3$ | 1% $Y_2O_3$ 1% MgO | 5% $Y_2O_3$ 5% MgO | None | 1% $Y_2O_3$ | 1% $Y_2O_3$ 1% MgO |
| Open porosity (%) | 44 | 46 | 44 | 45 | 36 | 43 | 41 | 39 |
| Average pore diameter ($\mu$m) | 8 | 5 | 5 | 8 | 4 | 2 | 1 | 2 |
| Thermal conductivity (W/m · K) | 21 | 18 | 24 | 20 | 9 | 21 | 18 | 14 |
| Thermal expansion coefficient (ppm/° C.) | 3.1 | 3.2 | 3.2 | 3.1 | 3.8 | 2.9 | 3.3 | 3.4 |
| β conversion ratio (%) | 94 | 92 | 99 | 95 | 92 | 88 | 72 | 78 |

6. The method of manufacturing a silicon nitride porous body according to claim 5, wherein the mixture is prepared by adding the element in 0.1 to 10 mass % as converted to the oxide thereof.

7. A ceramic filter comprising the silicon nitride porous body according to claim 1.

8. A component for purifying gas and/or solution, comprising a structure of loading a catalyst on a surface of the silicon nitride porous body according to claim 1.

9. A component for purifying gas and/or solution according to claim 8, wherein the catalyst is a NOx storage catalyst.

10. The silicon nitride porous body according to claim 2, wherein a test specimen cut out therefrom has a thermal conductivity of 10 W/m·K or above and a thermal expansion coefficient of 4 ppm/° C. or below.

11. The silicon nitride porous body according to claim 2, wherein a content ratio of β type silicon nitride to a total content of silicon nitride is 50% or above.

12. The silicon nitride porous body according to claim 10, wherein a content ratio of β type silicon nitride to a total content of silicon nitride is 50% or above.

* * * * *